United States Patent
Vafai et al.

(10) Patent No.: US 7,654,468 B2
(45) Date of Patent: Feb. 2, 2010

(54) METHODS AND DEVICES COMPRISING FLEXIBLE SEALS FOR MODULATING OR CONTROLLING FLOW AND HEAT

(76) Inventors: Kambiz Vafai, 22912 Arija, Mission Viejo, CA (US) 92691; Abdul Rahim A. Khaled, 1117 W. Linden St., Apt#7, Riverside, CA (US) 92507

( * ) Notice: Subject to any disclaimer, the term of this patent is extended or adjusted under 35 U.S.C. 154(b) by 661 days.

(21) Appl. No.: 10/840,303

(22) Filed: May 7, 2004

(65) Prior Publication Data
US 2004/0262852 A1 Dec. 30, 2004

Related U.S. Application Data

(60) Provisional application No. 60/470,850, filed on May 16, 2003.

(51) Int. Cl.
*G05D 23/00* (2006.01)
(52) U.S. Cl. .............. 236/93 A; 236/99 J; 165/46; 165/81
(58) Field of Classification Search .......... 165/46, 165/81, 82, 83, 80.4; 236/93 R, 93 D, 93 A, 236/99 B, 99 J, 101 R, 101 A, 101 E
See application file for complete search history.

(56) References Cited

U.S. PATENT DOCUMENTS

| | | | | |
|---|---|---|---|---|
| 4,109,707 A | * | 8/1978 | Wilson et al. | 165/46 |
| 5,130,889 A | * | 7/1992 | Hamburgen et al. | 361/707 |
| 5,984,257 A | * | 11/1999 | Baek et al. | 251/11 |
| 6,086,443 A | * | 7/2000 | Shin et al. | 445/25 |
| 6,457,515 B1 | * | 10/2002 | Vafai et al. | 165/80.4 |
| 6,708,945 B2 | * | 3/2004 | Horiuchi et al. | 251/11 |

OTHER PUBLICATIONS

Adams, T. M., Ghiaasiaan, S. M., Abdel-Khalik, S. I. (1999) "Enhancement of Liquid Forced Convection Heat Transfer in Microchannels Due to the Release of Dissolved Noncondensables", International Journal of Heat and Mass Transfer, 42, 3563-357.

Amon, C. H., Murthy, J., Yao, S. C., Narumanchi, S., Wu, C. F., Hsieh, C. C. (2001) "MEMS-Enabled Thermal Management of High-Heat-Flux Devices EDIFICE: Embedded Droplet Impingement for Integrated Cooling of Electronics", Experimental Thermal and Fluid Science, 25, 231-242.

(Continued)

*Primary Examiner*—Marc E Norman
(74) *Attorney, Agent, or Firm*—Kermit D. Lopez; Luis M. Ortiz; Ortiz & Lopez, PLLC (57) ABSTRACT

Disclosed herein are devices comprising at least one flexible seal, at least one flexible complex seal having at least one closed cavity containing a fluid, or a combination thereof. The devices may comprise at least one immobile and inflexible substrate and at least one mobile and inflexible substrate capable of movement due to the flexible seal, the flexible complex seal, or both. The flexible complex seals comprise at least one closed cavity comprising a fluid, such as a gas or a liquid. As disclosed, the presence or absence of heat will cause the mobile and inflexible substrate to move. The movement will increase or decrease the fluid amount or fluid flow rate in the primary fluid layer. Also disclosed are methods for enhancing the insulating properties of insulating assemblies.

11 Claims, 2 Drawing Sheets

OTHER PUBLICATIONS

Atmanand, M. A., Konnur, M. S. (1999) "A Novel Method of Using a Control Valve for Measurement and Control of Flow", IEEE Transactions on Instrumentation and Measurement, 48 1224-1226.

Baramov, L., Tutty, O. R., Rogers, E. (2004) "H ∞ Control of Nonperiodic Two-Dimensional Channel Flow", IEEE Transactions on Control Systems Technology, 12, 111-122.

Khaled, A. R. A. and Vafai, K. (2004) "Analysis of Oscillatory Flow Disturbances and Thermal Characteristics inside Fluidic Cells Due to Fluid Leakage and Wall Slip Conditions", Journal of Biomechanics, 37, 721-729.

Khaled, A. -R. A., and Vafai, K. (2002) "Flow and Heat Transfer Inside Thin Films Supported by Soft Seals in the Presence of Internal and External Pressure Pulsations", International Journal of Heat and Mass Transfer, 45, 5107-5115.

Khaled, A.-R A. and Vafai, K. (2003) "Cooling Enhancements in Thin Films Supported by Flexible Complex Seals in the Presence of Ultrafine Suspensions", ASME Journal of Heat Transfer, 125, 916-925.

Khaled, A.-R A. and Vafai, K. (2004) "Control of Exit Flow and Thermal Conditions Using Two-Layered Thin Films Supported by Flexible Complex Seals", International Journal of Heat and Mass Transfer, 47, 1599-1611.

Khaled, A.-R A. and Vafai, K. (2004) "Control of Insulating Properties Using Flexible Soft Seals", International Journal of Heat and Mass Transfer, 47, 1297-1304.

Lee, D.Y., and Vafai, K. (1999) "Comparative Analysis of Jet Impingement and Microchannel Cooling for High Heat Flux Applications, International Journal of Heat and Mass Transfer", 42, 1555-1568.

Petrov, V. A., (1997) "Combined Radiation and Conduction Heat transfer in High Temperature Fiber Thermal Insulation", International Journal of Heat and Mass Transfer, 40, 2241-2247.

Vafai, K., and Zhu L. (1999) "Analysis of a Two-Layered Micro Channel Heat Sink Concept in Electronic Cooling, International Journal of Heat and Mass Transfer", 42, 2287-2297.

Xuan, Y. M., Li, Q., (2000) "Heat transfer enhancement of nanofluids", International Journal of Heat and Fluid Flow, 21, 58-64.

Yilmaz, M. (2003) "The Effect of Inlet Flow Baffles on Heat Transfer", International Communications in Heat and Mass Transfer, 30, 1169-1178.

Young, T., and Vafai, K. (1998) "Convective Cooling of a Heated Obstacle in a Channel", International Journal of Heat and Mass Transfer, 41, 3131-3148.

Yuan, Z. X., (2000) "Numerical Study of Periodically Turbulent Flow and Heat Transfer in a Channel with Transverse Fin Arrays", International Journal of Numerical Methods For Heat & Fluid Flow, 10, 842-861.

Zhu, N., and Vafai, K (1998) "Analytical Modeling of the Startup Characteristics of Asymmetrical Flat-Plate and Disk-Shaped Heat Pipes", International Journal of Heat and Mass Transfer, 41, 2619-2637.

\* cited by examiner

METHODS AND DEVICES COMPRISING FLEXIBLE SEALS FOR MODULATING OR CONTROLLING FLOW AND HEAT

CROSS-REFERENCE TO RELATED APPLICATIONS

This application claims the benefit of U.S. Provisional Patent Application No. 60/470,850 filed 16 May 2003, which names Kambiz Vafai and Abdul Rahim A. Khaled as inventors.

BACKGROUND OF THE INVENTION

1. Field of the Invention

The present invention generally relates to thin film channels, microfluidic devices, biosensors, electronic cooling, control of fuel flow prior combustion and insulating assemblies.

2. Description of the Related Art

Thin films are used in a variety of devices, including electrical, electronic, chemical, and biological devices, for modulating or controlling flow and heat characteristics in the devices. See e.g. Vafai & Wang (1992) Internat'l J. of Heat and Mass Transfer 35:2087-2099, Vafai et al. (1995) ASME J. of Heat Transfer 117:209-218, Zhu & Vafai (1997) Internat'l J. of Heat and Mass Transfer 40:2887-2900, and Moon et al. (2000) Internat'l J. of Microcircuits and Electronic Packaging 23:488-493 for flat heat pipes; Fedorov & Viskanta (2000) Internat'l J. of Heat and Mass Transfer 43:399-415, Lee and Vafai (1999) Internat'l J. of Heat and Mass Transfer 42:1555-1568, and Vafai & Zhu (1999) Internat'l J. of Heat and Mass Transfer 42;2287-2297 for microchannel heat sinks; Lavrik et al. (2001) Biomedical Microdevices 3(1):35-44, and Xuan & Roetzel (2000) Internat'l J. of Heat and Mass Transfer 43:3701-3707 for biosensors and nanodevices.

For many of these applications, modulation and control of the flow and heat characteristics in the devices is desired. Unfortunately, the prior art methods for modulating and controlling the flow and heat are difficult or problematic. For example, a two phase flow in a microchannel is capable of removing maximum heat fluxes generated by electronic packages, but instability occurs near certain operating conditions. See Bowers & Mudwar (1994) ASME J. of Electronic Packaging 116:290-305. Further, the use of porous medium for cooling electronic devices enhances heat transfer via the increase in the effective surface area, but the porous medium results in a substantial increase in the pressure drop inside the thin film. See Huang & Vafai (1993) Internat'l J. of Heat and Mass Transfer 36:4019-4032, Huang & Vafai (1994) AIAA J. of Thermophysics and Heat Transfer 8:563-573, Huang & Vafai (1994) Internat'l J. of Heat and Fluid Flow 15:48-61, and Hadin (1994) ASME J. of Heat Transfer 116:465-472.

Therefore, a need still exists for methods of modulating or controlling heat and flow characteristics in thin films.

It is to be understood that both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

DESCRIPTION OF THE DRAWINGS

This invention is further understood by reference to the drawings wherein.

DETAILED DESCRIPTION OF THE EMBODIMENTS

In the description of the embodiments that follow, it is to be understood that all references to the "invention" are actually references to embodiments of the invention only. Accordingly, the following description applies only to the embodiments.

Part of the description of the embodiments includes mathematical analyses of some embodiments. Accordingly, it is to be understood that a mathematical analysis of an embodiment employs one or more mathematical models which by their nature can only be approximate and not an exact description of a particular embodiment. It is to be understood that when various variables are maximized, minimized, or stated to meet some other type of criterion, such assertions are made only to carry out the mathematical analysis and are not necessarily to be interpreted as limitations on any particular embodiment.

The present invention provides methods for modulating or controlling heat and flow characteristics in a variety of devices. In particular, the present invention provides flexible seals for modulating or controlling heat and flow characteristics in devices comprising thin films, such as thin film channels, microchannels, microfluidics and the like. As used herein, a "flexible seal" refers to a material that can be deformed significantly according to the load acting upon it. Examples of these materials include elastmors, polymers, natural rubber, closed rubber cell foams, and the like. In some embodiments, the present invention provides flexible complex seals for modulating or controlling heat and flow characteristics in devices comprising thin films, such as microchannels and microfluidics. As used herein, a "flexible complex seal" refers to a flexible seal comprising at least one closed cavity of stagnant fluid. In preferred embodiments, the stagnant fluid has at least one point of contact with the heated surface of the device. In preferred embodiments, the stagnant fluid has a large value of the volumetric thermal coefficient. As used herein, a "fluid" refers to a continuous amorphous substance that tends to flow and to conform to the outline of a container, such as a liquid or a gas, and may be used in accordance with the present invention. As used herein, "stagnant fluid" refers to a fluid that is not circulating or flowing and in preferred embodiments of the present invention, the stagnant fluid is surrounded by a flexible seal of the present invention and/or the surfaces of a device such that the average translational velocity of the fluid is zero.

As used herein, "primary fluid" refers to the fluid that the devices of the present invention control or modulate its flow rate or its temperature. As used herein, "secondary fluid" refers to an auxiliary fluid utilized in the present invention to achieve additional control and modulation features for the primary fluid flow rate and temperature. As provided herein, the stagnant fluid in the complex flexible seals can have characteristics that are the same as or different from the characteristics of the primary fluid, the secondary fluid, or both. As used herein, "biofluid" refers to the fluid that contains at least one species of a biological substance for which a measurement is desired. As provided herein, the primary fluid can be a biofluid.

The flexible seals and flexible complex seals of the present invention are typically found between a first substrate and a second substrate of a thin film or other thermal systems such as the insulating assemblies. As used herein, "substrate" includes plates which may be inflexible or flexible. In some preferred embodiments, the elastic modulus for the seals of the present invention, the ratio of the applied stress on the seal to the induced strain, range from about $10^3 N/m^2$ to about $10^7 N/m^2$. The seals of the present invention may comprise at least one closed cavity of a fluid such as air or the like in order to minimize their effective elastic modulus. The deformation of the flexible seals of the present invention can be guided by special guiders to attain maximum or desired deformations. In preferred embodiments, the flexible seals comprise different cross-sectional geometries, such as circular cross-section, rectangular cross-section and the like. As used herein, "thin films" include fluidic devices that have the thickness of their fluidic layers of an order of about a millimeter or less such as, microchannels and microfluidic devices. Thin films comprise at least two substrates, lower and upper substrates, and at least one fluidic layer.

As disclosed herein, modulating the thermal characteristics of a device may be conducted by modifying the thin film thickness, the thermal load, the flow rate, or a combination thereof. For example, additional cooling can be achieved if the thin film thickness is allowed to increase by an increase in the thermal load, which will cause the coolant flow rate to increase. As provided herein, the enhancement in the cooling due to the flexible complex seals used is substantial at larger thermal loads for stagnant liquids while this enhancement is much larger at lower temperatures for stagnant gases, especially ideal gases. This is because the volumetric thermal expansion coefficient increases for liquids and decreases for gases as the temperature increases.

Khaled and Vafai analyzed the enhancement in the heat transfer inside thin films supported by flexible complex seals. See Khaled & Vafai (2003) ASME J. of Heat Transfer 125: 916-925. Specifically, the applied thermal load was considered to vary periodically with time in order to investigate the behavior of expandable thin film systems in the presence of a noise in the applied thermal load. As provided herein, a noticeable enhancement in the cooling capacity can be achieved for large thermal loads especially in cooling of high flux electronic components (q ≈700 kW/$m^2$) since they produce elevated working temperatures. Also, the generated squeezing effects at the mobile and inflexible substrate can be minimized when nanofluids are employed in the coolant flow. As used herein, "nanofluids" are mixtures of a working fluid, such as water, and suspended ultrafine particles in the fluid such as copper, aluminum, or the like with diameters of an order of about the nanometer range. See Eastman et al. (2001) Applied Physics Letters 78: 718-720

The flexible seals, flexible complex seals, or both of the present invention may be used in two-layered thin films in order to regulate the flow rate of the primary fluid layer such that excessive heating in the secondary fluid layer results in a reduction in the primary fluid flow rate. For example, the flexible seals, flexible complex seals, or both of the present invention may be applied in the internal combustion industry where the fuel flow rate should be reduced as the engine gets overheated. In this example, the primary fluid flow is the fuel flow while the secondary fluid flow can be either flow of combustion products, flow of engine coolant or flow of any other auxiliary fluid. The flexible seals, flexible complex seals, or both of the present invention may be used to modulate or control exit thermal conditions in devices comprising two-layered thin films. For example, the flexible seals, flexible complex seals, or both of the present invention may be used to minimize bimaterial effects of various biosensors, including microcantilever based biosensors, which are sensitive to flow temperatures. See Fritz et al. (2000) Science 288:316-318, . In this example, the primary fluid flow is flow of a biofluid while the secondary fluid flow can be either flow of the external surrounding fluid or flow of any auxiliary fluid.

As provided herein, thin films comprising flexible seals, flexible complex seals, or both are modeled and designed in order to alleviate the thermal load or modulate the flow. These systems according to the present invention provide noticeable control of the flow rate, reduce thermal gradients within the primary fluid layer at relatively large external thermal loads, and minimize fluctuation at the mobile and inflexible substrate in the presence of nanofluids.

1. Control of Exit Flow and Thermal Conditions Using Two-Layered Thin Films Supported by Flexible Complex Seals Although thin films are characterized by having laminar flows with relatively low Reynolds numbers leading to stable hydrodynamic performance, the thickness of the thin films is small enough such that small disturbances at one of the boundaries may cause a significant squeezing effect at the boundary. See e.g. Langlois (1962) Quarterly of Applied Math. XX: 131-150 (flow inside isothermal oscillatory squeezed films with fluid density varying with the pressure), Khaled & Vafai (2002) Numerical Heat Transfer, Part A 41:451-467 and Khaled & Vafai (2003) Internat'l J. of Heat and Mass Transfer 46:631-641 (flow and heat transfer inside incompressible thin films having a prescribed oscillatory squeezing at one of their boundaries), and Khaled & Vafai (2002) Internat'l J. of Heat and Mass Transfer 45:5107-5115 (internal pressure through the elastic behavior of the supporting seal).

Recently, the situation where the squeezing effect at the free substrate is initiated by thermal effects was studied. See Khaled & Vafai (2003) ASME J. of Heat Transfer 125:916-925. As provided herein, flexible seals with closed cavities of stagnant fluids having a relatively large volumetric thermal expansion coefficient, flexible complex seal, were studied. Flexible complex seals in a single layer thin film can cause flooding of the coolant when the thermal load of the thin film is increased over its projected capacity. As a result, an enhancement in the cooling process is attained especially if ultrafine suspensions are present in the coolant, a fluid that exhibits high heat transfer performance. Ultrafine suspensions in the fluid such as copper or aluminum particles with diameters of order nanometer are found to enhance the effective thermal conductivity of the fluid. See Eastman et al. (2001) Applied Physics Letters 78: 718-720.

As provided herein, the flow and heat transfer inside an oscillatory disturbed two-layered thin film channel supported by flexible complex seals in the presence of suspended ultrafine particles was studied. Oscillatory generic disturbances were imposed on the two-layered thin film channels supported by flexible complex seals in the presence of suspended ultrafine particles, which correspond to disturbances in the upper substrate temperature and in the inlet pressure of the secondary fluid layer. The governing continuity, momentum and energy equations for both layers were non-dimensionalized and categorized for small Reynolds numbers and negligible axial conduction. The deformation of the supporting seals was linearly related to both the pressure difference across the two layers and the upper substrate's temperature based on the theory of the linear elasticity and the principle of the volumetric thermal expansion of the stagnant fluid filling the closed cavities of the flexible complex seals.

As provided herein, the flow rate and heat transfer in the main thin film channel can be increased by an increase in the softness of the seals, the thermal squeezing parameter, the thermal dispersion effect and the total thickness of two-layered thin film. However, the flow rate and heat transfer in the main thin film channel decrease as the dimensionless thermal expansion coefficient of the seals and the squeezing number of the primary fluid layer increase. Both the increase in thermal dispersion and the thermal squeezing parameter for the secondary fluid layer were found to increase the stability of the intermediate or the mobile and inflexible substrate. Furthermore, the two-layered thin film channel was found to be more stable when the secondary fluid flow was free of pulsations or it had relatively a large pulsating frequency. Finally, the proposed two-layered thin film supported by flexible complex seals, unlike other controlling systems, does not require additional mechanical control or external cooling devices, i.e. is self-regulating for the flow rate and temperature of a primary fluid layer.

The following Table 6 provides the various symbols and meanings used in this section:

TABLE 6

| | |
|---|---|
| B | thin film length |
| $C_F$ | correction factor for the volumetric thermal expansion coefficient |
| $c_p$ | specific heat of the fluid |
| D | width of the thin film |
| E* | softness index of seals supporting the intermediate or mobile and inflexible substrate |
| G | width of closed cavity containing stagnant fluid |
| $H_t$ | dimensionless total thickness of the two-layered thin film |
| $F_T$ | dimensionless coefficient of the thermal expansion for the complex seal |
| H, h, $h_o$ | dimensionless, dimensional and reference thin film thickness |
| $h_c$ | convective heat transfer coefficient |
| K* | effective stiffness of the sealing |
| k | thermal conductivity of the fluid |
| $k_o$ | reference thermal conductivity of the fluid |
| Nu | lower substrate's Nusselt number |
| $P_S$ | thermal squeezing parameter |
| p | fluid pressure |
| $q_o$ | reference heat flux at the lower substrate for UHF |
| T, $T_o$ | temperature in fluid and the inlet temperature |
| t | time |
| $V_o$ | reference axial velocity |
| U, $U_m$ | dimensionless axial and average axial velocities |
| u | dimensional axial velocity |
| V, v | dimensionless and dimensional normal velocities |
| X, x | dimensionless and dimensional axial coordinates |
| Y, y | dimensionless and dimensional normal coordinates |
| $\alpha$ | thermal diffusivity of the fluid |
| $\beta_q$ | dimensionless amplitude of the thermal load |
| $\beta_p$ | dimensionless amplitude of the pressure |
| $\beta_T$ | coefficient of volumetric thermal expansion |
| $\epsilon$ | perturbation parameter |
| $\phi_p$ | phase shift angle |

TABLE 6-continued

| | |
|---|---|
| $\gamma$ | dimensionless frequency of the thermal load |
| $\gamma_p$ | dimensionless frequency of the internal pressure |
| $\mu$ | dynamic viscosity of the fluid |
| $\theta, \theta_m$ | dimensionless temperature and dimensionless mean bulk temperature |
| $\rho$ | density of the fluid |
| $\tau, \tau^*$ | dimensionless time |
| $\sigma$ | squeezing number |
| $\omega$ | reciprocal of a reference time (reference squeezing frequency) |
| $\eta$ | variable transformation for the dimensionless Y-coordinate |
| $\lambda$ | dimensionless dispersion parameter |
| $\Pi$ | dimensionless pressure |
| $\Pi_n$ | dimensionless inlet pressure |
| $\Lambda$ | reference lateral to normal velocity ratio |
| Subscripts | |
| i | $i^{th}$ layer |
| l | lower substrate |
| P | due to pressure |
| T | due to thermal expansion |
| u | upper substrate |

The present invention provides flexible complex seals. The flexible complex seals may be used in two-layered thin films are utilized in order to regulate the flow rate of the primary fluid layer such that excessive heating in the second layer results in a reduction in the primary fluid flow rate. The flexible complex seals of the present invention may be used in internal combustion applications where the fuel flow rate should be reduced as an engine gets overheated. The flexible complex seals of the present invention may be used to minimize bimaterial effects of many biosensors that are sensitive to heat and flow conditions. See Fritz et al. (2000) Science 288:316-318.

1A. Problem Formulation and Analysis

Figure 1A:
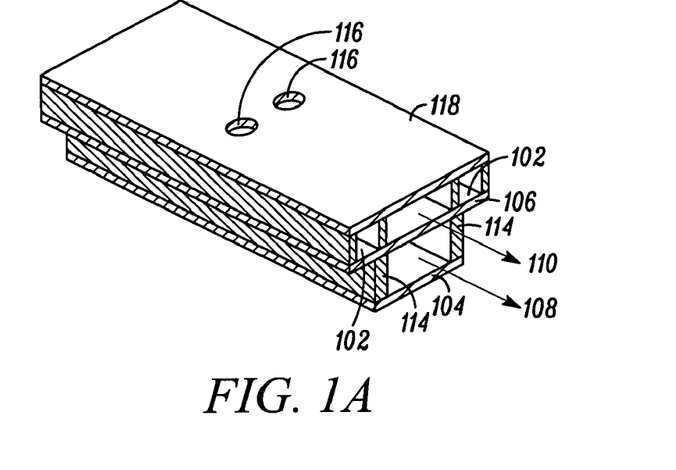
FIG. 1A illustrates a perspective view of a thin film according to an embodiment.
Figure 1B:
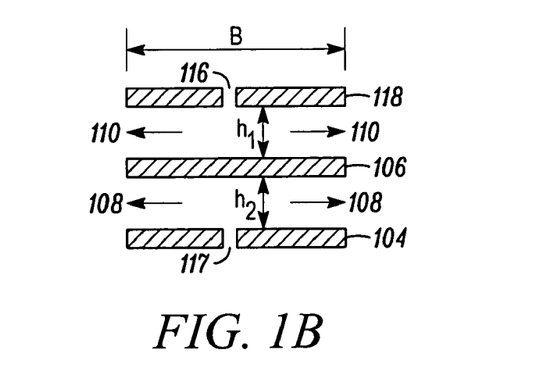
FIG. 1B illustrates a view of a slice of the thin film of FIG. 1A parallel to an axial direction according to an embodiment.
Figure 1C:
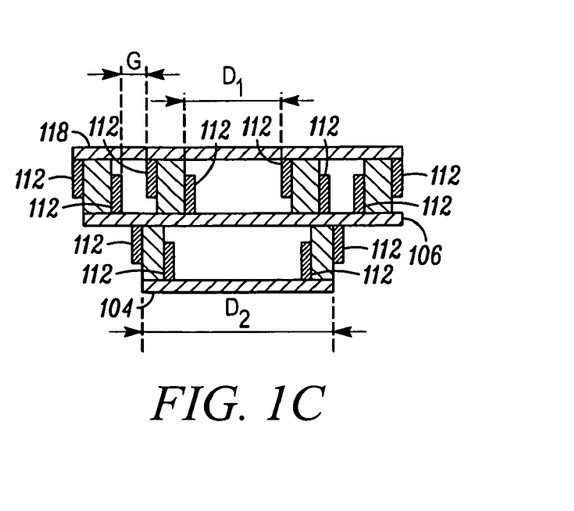
FIG. 1C illustrates a view of the slice of the thin film of FIG. 1A perpendicular to the axial direction according to an embodiment.

FIG. 1A, 1B, and C illustrate a two-layered thin film supported by flexible complex seals 102. F*ig*. 1A is a perspective view of an embodiment, FIG. 1B illustrates a slice of an embodiment parallel to an axial direction (arrows 108 or 110), and FIG. 1C illustrates a slice of an embodiment perpendicular to the axial direction. The lower layer comprises the primary fluid flow passage where the lower substrate 104 is fixed (immobile and inflexible substrate) and the intermediate substrate 106 is insulated and free to move in the vertical direction (mobile and inflexible substrate). The primary fluid flow )direction arrow 108) is that of a fluid sample, such as the fuel flow or fuel-air mixture prior to combustion or flow of a biofluid in a fluidic cell. The upper layer of the thin film comprises a secondary fluid flow (direction arrow 110) parallel or counter to the primary fluid flow direction. This flow can have similar properties as the primary fluid flow. This insulating assembly is suitable for fluidic cell applications since inlet pressure pulsations may be equal across the intermediate substrate 106, thereby reducing disturbances at the intermediate substrate 106. The secondary fluid flow, however, can have different properties than the primary fluid flow. For example, when the secondary fluid flow is initiated from external processes such as flow of combustion residuals or the engine coolant flow.

Referring to FIG. 1B, arrows 110 indicate exit ports for the secondary fluid flow, and arrows 108 indicate exit ports for the primary fluid flow. FIG. 1B is a slice that cuts across inlet ports, showing inlet port 116 for the secondary fluid flow, and inlet port 117 for the primary fluid flow. For ease of illustration, FIG. 1C does not show the inlet ports.

The heat flux of the upper substrate 118 can be independent of the primary fluid flow or can be the result of external processes utilizing the primary fluid flow as in combustion processes. The latter can be used for controlling the primary fluid flow conditions while the former may model the increase in the ambient temperature in a fluidic cell application, thereby preventing an increase in the average fluid temperature in an ordinary fluidic cell avoiding a malfunctioning of a device such as a biosensor.

The sealing assembly of the upper layer comprises flexible complex seals 102 closed cavities filled with a stagnant fluid having a relatively large volumetric thermal expansion coefficient. Any excessive heating at the upper substrate results in an increase in the upper substrate's temperature such that the stagnant fluid becomes warmer and expands. This expansion along with the increase in inlet pressure in the upper layer, if present, cause the intermediate substrate 106 to move downward. Thus, a compression in the film thickness of the lower layer is attained resulting in reduction in mass flow rate within the primary fluid flow compartment. This insulating assembly may be used to control combustion rates since part of the excessive heating and increased pressure due to deteriorated combustion conditions can be utilized to prescribe the heat flux at the upper substrate. Thus, the flow rate of the fuel in the primary fluid layer can be reduced and combustion is controlled.

In fluidic cells, excessive heating at the upper substrate causes compression to the primary fluid layer's thickness. Thus, average velocity in the primary fluid layer increases, when operated at constant flow rates, enhancing the convective heat transfer coefficient. This causes the average fluid temperature to approach the lower substrate temperature, thereby reducing the bimaterial effects. When it is operated at a constant pressure or at a constant velocity, the compression of the primary fluid layer due to excessive heating at the upper substrate reduces the flow rate. Thus, the fluid temperatures approach the lower substrate temperature at a shorter distance. As such, bimaterial effects are also reduced. The flexible seals may be placed between guiders 112 as shown in FIG. 1C. The use of guiders 112 for the flexible seals 114, including flexible complex seals 102, of the present invention minimize side expansion and help maximize the transverse thin film thickness expansion.

As provided herein, upper and lower thin films that have small thicknesses $h_1$ and $h_2$, respectively, compared to their length B and their width $D_1$ and $D_2$, respectively, were analyzed. The x-axis for each layer is taken along the axial direction (direction arrows 108, 110) of the thin film while y-axis for each layer is taken along its thickness as shown in FIG. 1B. Further, the film thickness was assumed to be independent of the axial direction. For example, as in symmetric thin films having a fluid injected from the center inlet ports 116 as shown in FIG. 1A.

Both lower substrate 104 and upper substrate 118 were assumed to be fixed (immobile and inflexible substrates) while the intermediate substrate 106 was free to move only in the normal direction due to the use of flexible complex seals (mobile and inflexible substrate). The generic motion of the intermediate substrate due to both variations of the stagnant fluid temperature in the secondary fluid flow passage and the induced internal pressure pulsations within both primary fluid and secondary fluid flow passages is expressed according to the following Equation 41:

$$H_l = \frac{h_l}{h_o} = (1 + H_T + H_p) \quad \text{Eq. 41}$$

where
  $h_o$ is a reference thickness for the primary fluid passage
  $H_1$ is the dimensionless motion of the intermediate substrate
  $H_T$ is the dimensionless motion of the intermediate substrate due to the volumetric thermal expansion of the stagnant fluid
  $H_p$ is the dimensionless motion of the intermediate substrate due to the deformation in seals as a result of the internal pressure.

The fluid was assumed to be Newtonian having constant average properties except for the thermal conductivity. The general two-dimensional continuity, momentum and energy equations for a laminar thin film are given as follows:

$$\frac{\partial u_i}{\partial x_i} + \frac{\partial v_i}{\partial y_i} = 0 \quad \text{Eq. 42}$$

$$\rho_i\left(\frac{\partial u_i}{\partial t} + u_i\frac{\partial u_i}{\partial x_i} + v_i\frac{\partial u_i}{\partial y_i}\right) = -\frac{\partial p_i}{\partial x_i} + \mu_i\left(\frac{\partial^2 u_i}{\partial x_i^2} + \frac{\partial^2 u_i}{\partial y_i^2}\right) \quad \text{Eq. 43}$$

$$\rho_i\left(\frac{\partial v_i}{\partial t} + u_i\frac{\partial v_i}{\partial x_i} + v_i\frac{\partial v_i}{\partial y_i}\right) = -\frac{\partial p_i}{\partial y_i} + \mu_i\left(\frac{\partial^2 v_i}{\partial x_i^2} + \frac{\partial^2 v_i}{\partial y_i^2}\right) \quad \text{Eq. 44}$$

$$(\rho c_p)_i\left(\frac{\partial T_i}{\partial t} + u_i\frac{\partial T_i}{\partial x_i} + v_i\frac{\partial T_i}{\partial y_i}\right) = \frac{\partial}{\partial x_i}\left(k_i\frac{\partial T_i}{\partial x_i}\right) + \frac{\partial}{\partial y_i}\left(k_i\frac{\partial T_i}{\partial y_i}\right) \quad \text{Eq. 45}$$

where
  T is the fluid temperature
  u is the dimensional axial velocity
  v is the dimensional normal velocity
  ρ is the average fluid density
  p is pressure
  μ is the average fluid dynamic viscosity
  cp is the average specific heat of the fluid
  k is the thermal conductivity of the fluid When the fluid contains suspended ultrafine particles, these properties will be for the resulting dilute mixture so long as the diameter of the particles is very small compared to $h_o$. The index "i" is "1" when analyzing the primary fluid layer while it is "2" when analyzing the secondary fluid layer. Equations 42-45 are non-dimensionalized using the following dimensionless variables:

$$X_i = \frac{x_i}{B} \quad \text{Eq. 46a}$$

$$Y_i = \frac{y_i}{h_o} \quad \text{Eq. 46b}$$

$$\tau = \omega t \quad \text{Eq. 46c}$$

$$U_i = \frac{u_i}{(\omega B + V_{oi})} \quad \text{Eq. 46d}$$

$$V_i = \frac{v_i}{h_o \omega} \quad \text{Eq. 46e}$$

$$\Pi_i = \frac{p_i - p_{ei}}{\mu_i\left(\omega + \frac{V_{oi}}{B}\right)\varepsilon^{-2}} \quad \text{Eq. 46f}$$

$$\theta_1 = \frac{T_1 - T_{1o}}{(T_w - T_{1o})} \quad \text{Eq. 46g}$$

$$\theta_2 = \frac{T_2 - T_{2o}}{q_o h_o / k_{2o}} \quad \text{Eq. 46h}$$

where
- $\omega$ is the reference frequency of the disturbance
- $T_{1o}$ is the inlet temperature for the primary fluid flow
- $T_{2o}$ is the inlet temperature for the secondary fluid flow
- $T_w$ is the lower substrate temperature
- $p_e$ is the reference pressure which represents the exit pressure for both layers
- $q_o$ is the reference heat flux at the upper substrate
- $k_{2o}$ is the stagnant thermal conductivity of the secondary fluid
- $V_{o1}$ is the reference dimensional velocity for the lower layer
- $V_{o2}$ is the reference dimensional velocity for the upper layer
- $\epsilon$ is the perturbation parameter, $$\varepsilon = \frac{h_o}{B}$$

The prescribed heat at the upper substrate, $q_u$, as well as the dimensionless inlet pressure, $\Pi_{2n}$, for the secondary fluid flow vary according to the following generic relationships:

$$q_u = q_o(1 + \beta_q \sin(\gamma \omega t)) \qquad \text{Eq. 47}$$

$$\Pi_{2n} = \Pi_{2o}(1 + \beta_p \sin(\gamma_p \omega t + \phi_p)) \qquad \text{Eq. 48}$$

where
- $\beta_q$ is the dimensionless amplitude of upper substrate's heat flux
- $\beta_p$ is the dimensionless amplitude for the inlet pressure for the secondary fluid flow
- $\gamma$ is the dimensionless frequency for the upper substrate heat flux
- $\gamma_p$ is the dimensionless frequency for the inlet pressure for the secondary fluid layer The variables $X_i$, $Y_i$, $\tau$, $U_i$, $V_i$, $\Pi_i$ and $\theta_i$ are the dimensionless forms of $x_i$, $y_i$, $t$, $u_i$, $v_i$, $p_i$ and $T_i$ variables, respectively.

For the two-layered thin film shown in FIG. 1A the displacement of the intermediate substrate due to internal pressure variations was related to the difference in the average dimensionless pressure across the intermediate substrate through the theory of the linear elasticity by:

$$H_p = E_1^* \frac{(\Pi_{AVG})_1}{\sigma_1} - E_2^* \frac{(\Pi_{AVG})_2}{\sigma_2} \qquad \text{Eq. 49}$$

where $(\Pi_{AVG})_1$ and $(\Pi_{AVG})_2$ are the average dimensionless pressure in the primary fluid and the secondary fluid layers, respectively. The parameter $E_i^*$ will be referred to as the softness index of the supporting seal in layers "1" or "2" and will be denoted as $E^*$ when $E_1^* = E_2^*$. It has the following functional form:

$$E_i^* = \frac{12 L^* \mu_i \omega D_i}{K^* \varepsilon^3} \qquad \text{Eq. 50}$$

where $K^*$ is the effective stiffness of the seals that support the intermediate substrate. The dimensionless parameter $L^*$ is introduced to account for the elastic contribution of the intermediate substrate in the calculation of the displacement.

As provided herein, the analysis was performed for relatively small thermal load frequencies in order to ascertain that squeezing generated flows are in the laminar regime. For these frequencies, Equation 49 was applicable and the inertia effect of the intermediate substrate was negligible. Moreover, the increase in the thickness due to a pressure increase in the thin film causes a reduction in the stagnant fluid pressure. This action stiffens the insulating assembly. Therefore, the stiffness $K^*$ was considered to be the effective stiffness for the insulating assembly and not for the seal itself. From the practical point of view, the closed cavity width G was taken to be large enough such that a small increase in the stagnant fluid pressure due to the thermal expansion can support the associated increase in the elastic force on the seal.

The dimensionless displacement of the intermediate substrate due to the thermal expansion was related to the dimensionless average temperature of the upper substrate, $(\theta_u)_{AVG}$, by the following linearized model:

$$H_T = -F_T(\theta_u)_{AVG} \qquad \text{Eq. 51}$$

where $F_T$ is named the dimensionless thermal expansion parameter and is equal to:

$$F_T = A^* \frac{\beta_T q_o h_o}{k_{2o}} C_F \qquad \text{Eq. 52}$$

The coefficient $A^*$ depends on the closed cavities dimensions and their geometry. The parameter $\beta_T$ is the volumetric thermal expansion coefficient of the stagnant fluid in its approximate form:

$$\beta_T \approx \frac{1}{V_{so}} \frac{(V_s - V_{s1})}{(T_s - T_{2o})}\bigg|_{p_{s1}}$$

evaluated at the pressure $p_{s1}$ corresponding to the stagnant fluid pressure in the closed cavities when the secondary fluid flow temperature was kept at inlet temperature of the secondary fluid layer $T_{2o}$. The closed cavity volumes $V_{so}$, $V_{s1}$ and $V_s$ represent the closed cavity volume at the reference condition ($h_2 = h_o$), the closed cavity volume when the pressure in the closed cavities is $p_{s1}$ and the closed cavity volume at normal operating conditions where the average stagnant fluid temperature is $T_s$, respectively. The factor $C_F$ represents the volumetric thermal expansion correction factor. This factor was introduced in order to account for the increase in the stagnant pressure due to the increase in the elastic force in the seal during the expansion which tends to decrease the effective volumetric thermal expansion coefficient. It approaches one as the closed cavity width G increases and it can be determined theoretically using methods known in the art.

The parameter $F_T$ is enhanced at elevated temperatures for liquids and at lower temperatures for gases because $\beta_T$ increases for liquids and decreases for gases as the temperature increases. Dimensionless thermal expansion parameter is further enhanced by a decrease in $k_o$, an increase in $q_o$, an increase in $E_i^*$ or an increase in $h_o$. Equation 51 is based on the assumption that the stagnant fluid temperature is similar to the average upper substrate temperature since closed cavity surfaces were considered insulated except for the region facing the upper substrate in order to provide a maximum volumetric thermal expansion to the closed cavities. Moreover, the heat flux on the upper substrate was assumed to be applied to the portion that faces the secondary fluid flow.

The thermal conductivity of the fluid was considered to vary with the flow speed in order to account for thermal dispersion effects when suspended ultrafine particles were present in the secondary fluid flow. Induced squeezing effects at the intermediate substrate due to time variations in the thermal load or inlet pulsative pressures were expected to enhance the heat transfer inside fluid layers due to thermal dispersion effects. To account for this increase, a linear model between the effective thermal conductivity and the fluid speed was utilized as provided by Equation 53. See Xuan & Roetzel (2000) Internat'l J. of Heat and Mass Transfer 43:3701-3707, $$k_i(X_i, Y_i, \tau) = (k_o)_i(1+\lambda_i \sqrt{U^2(X_i,Y_i,\tau)+\Lambda_i^2 V^2(X_i,Y_i,\tau)}) = (k_o)_i \phi_i(X_i, Y_i, \tau) \quad \text{Eq. 53}$$

where $\lambda_i$ and $\Lambda_i$ are the dimensionless thermal dispersion coefficient and reference squeezing to lateral velocity ratio which are:

$$\lambda_i = C_i^*(\rho c_p)_{fi} h_o(V_{oi} + \omega B) \quad \text{Eq. 54a}$$

$$\Lambda_i = \frac{\varepsilon \sigma_i}{12} \quad \text{Eq. 54b}$$

The coefficient C* depends on the diameter of the ultrafine particle, its volume fraction and both fluid and the particle properties. The parameter $(\rho c_p)_{fi}$ is the density times the specific heat of the fluid resulting from the mixture of the pure fluid and the ultrafine particles suspensions within the $i^{th}$ layer while $(k_o)_i$ is the stagnant thermal conductivity of the working fluid in the $i^{th}$ layer that contains ultrafine particles. This stagnant thermal conductivity is usually greater than the thermal conductivity of the pure fluid. See Eastman et al. (2001) Applied Physics Letters 78:718-720,. All the fluid properties that appear in Equations 42-45 should be replaced by the effective mixture properties which are functions of the pure fluid and the particles and that the diameter of the ultrafine particles are so small that the resulting mixture behaves as a continuum fluid. See Xuan & Roetzel (2000) Internat'l J. of Heat and Mass Transfer 43:3701-3707.

Flows inside thin films are in laminar regime and could be considered creep flows in certain applications as in lubrication and biological applications. Therefore, the low Reynolds numbers flow model was adopted and applied to Equations 42-44 and the results of dimensionalizing the energy equation result in the following reduced non-dimensionalized equations:

$$U_i = \frac{1}{2}\frac{\partial \Pi_i}{\partial X} H_i^2 \left(\frac{Y_i}{H_i}\right)\left(\frac{Y_i}{H_i} - 1\right) \quad \text{Eq. 55}$$

$$V_i = \frac{dH_i}{d\tau}\left(3\left(\frac{Y_i}{H_i}\right)^2 - 2\left(\frac{Y_i}{H_i}\right)^3\right) \quad \text{Eq. 56}$$

$$\frac{\partial \Pi_i}{\partial Y_i} = 0 \quad \text{Eq. 57}$$

$$\frac{\partial}{\partial X_i}\left(H_i^3 \frac{\partial \Pi_i}{\partial X_i}\right) = \sigma_i \frac{\partial H_i}{\partial \tau} \quad \text{Eq. 58}$$

$$(P_S)_i\left(\frac{\partial \theta_i}{\partial \tau} + \frac{12}{\sigma_i} U_i \frac{\partial \theta_i}{\partial X_i} + V_i \frac{\partial \theta_i}{\partial Y_i}\right) = \frac{\partial}{\partial Y_i}\left(\phi_i \frac{\partial \theta_i}{\partial Y_i}\right) \quad \text{Eq. 59}$$

The axial diffusion term in the dimensionalized energy equation, Equation 59, is eliminated because it is of order $\epsilon^2$.

The parameters $\sigma_i$ and $(P_S)_i$ are called the squeezing number and the thermal squeezing parameter, respectively, and are defined as:

$$\sigma_i = \frac{12}{1 + \frac{V_{oi}}{\omega B}} \quad \text{Eq. 60a}$$

$$(P_S)_i = \frac{(\rho c_p)_i h_o^2 \omega}{k_i} \quad \text{Eq. 60b}$$

The dimensionless thickness of the lower layer and the upper layer are defined as:

$$H_1 = \frac{h_1}{h_o} \quad \text{Eq. 61a}$$

$$H_2 = \frac{h_2}{h_o} \quad \text{Eq. 61b}$$

The reference thickness $h_o$ can be determined using the force balance across the intermediate substrate due to the flow exit pressures of both layers at static conditions using methods known in the art. The reference thickness $h_o$ can be controlled by either varying flow exit pressures for each layer prior injecting of both flows, by a proper selection to the undistorted thickness of the supporting seals in each layer or by using both, according to methods known in the art. Therefore, the dimensionless thicknesses $H_1$ and $H_2$ are related to each other through the following relation as both lower and upper substrates are fixed (immobile and inflexible substrates):

$$H_1 + H_2 = H_t \quad \text{Eq. 62}$$

where $H_t$ is a constant representing the dimensionless total thickness of the two-layered thin film.

Two conditions will be imposed for the inlet flow rate of the primary fluid layer. In applications that require minimizations of thermal effects due to an increase in heat transfer from the environment such as for fluidic cells of biological and chemical sensing devices, the inlet flow rate for the lower layer is assumed to be constant and referred to as the CIF condition. However, constant inlet pressure was assumed to model flow of fluids in combustion applications such as flow of fuel prior to the mixing section and is referred as the CIP condition. The previously defined reference velocities $V_{o1}$ and $V_{o2}$ represent the velocity in the flow passages at zero values of the parameters $E_1^*$, $E_2^*$ and $F_T$. Accordingly, the inlet dimensionless pressures vary with the squeezing numbers according to following relations for the CIP condition:

$$\Pi_{1n} = 12 - \sigma_1 \quad \text{Eq. 63}$$

$$\Pi_{2n} = (12 - \sigma_2)(1 + \beta_p \sin(\gamma_p \tau + \phi_p)) \quad \text{Eq. 64}$$

Therefore, the solution of the Reynolds equations for the CIP condition will reveal the following relationships for the dimensionless pressure gradient, the dimensionless pressure and the average dimensionless pressure $\Pi_{AVG}$ inside lower and upper layers:

$$\frac{\partial \Pi_1(X_1, \tau)}{\partial X_1} = \frac{\sigma_1}{H_1^3}\frac{dH_1}{d\tau}\left(X_1 - \frac{1}{2}\right) - (12 - \sigma_1) \quad \text{Eq. 65a}$$

-continued $$\frac{\partial \Pi_2(X_2, \tau)}{\partial X_2} = \frac{\sigma_2}{H_2^3}\frac{dH_2}{d\tau}\left(X_2 - \frac{1}{2}\right) - (12-\sigma_2)(1+\beta_p\sin(\gamma_p\tau+\varphi_p))$$ Eq. 66

$$\Pi_1(X_1, \tau) = \frac{\sigma_1}{2H_1^3}\frac{dH_1}{d\tau}(X_1^2 - X_1) - (12-\sigma_1)(X_1 - 1)$$ Eq. 67a $$\Pi_2(X_2, \tau) = \frac{\sigma_2}{2H_2^3}\frac{dH_2}{d\tau}(X_2^2 - X_2) - (12-\sigma_2)(X_2 - 1)(1+\beta_p\sin(\gamma_p\tau+\varphi_p))$$ Eq. 68

$$(\Pi_{AVG}(\tau))_1 = -\frac{\sigma_1}{12H_1^3}\frac{dH_1}{d\tau} + \frac{(12-\sigma_1)}{2}$$ Eq. 69a $$(\Pi_{AVG}(\tau))_2 = -\frac{\sigma_2}{12H_2^3}\frac{dH_2}{d\tau} + \frac{(12-\sigma_2)}{2}(1+\beta_p\sin(\gamma_p\tau+\varphi_p))$$ Eq. 70

For the CIF condition, the dimensionless pressure gradient, the dimensionless pressure and the average dimensionless pressure $\Pi_{AVG}$ inside lower layer were changed to the following:

$$\frac{\partial \Pi_1(X_1, \tau)}{\partial X_1} = \frac{\sigma_1}{H_1^3}\frac{dH_1}{d\tau}X_1 - \frac{(12-\sigma_1)}{H_1^3}$$ Eq. 65b $$\Pi_1(X_1, \tau) = \frac{\sigma_1}{2H_1^3}\frac{dH_1}{d\tau}(X_1^2 - 1) - \frac{(12-\sigma_1)}{H_1^3}(X_1 - 1)$$ Eq. 67b $$(\Pi_{AVG}(\tau))_1 = -\frac{\sigma_1}{3H_1^3}\frac{dH_1}{d\tau} + \frac{(12-\sigma_1)}{2H_1^3}$$ Eq. 69b 1B. Thermal Boundary Conditions The dimensionless initial and thermal boundary conditions for the previously defined problem were taken as follows:

$$\theta_1(X_1, Y_1, 0) = 0, \ \theta_1(0, Y_1, \tau) = 0, \ \theta_1(X_1, 0, \tau) = 1,$$
$$\frac{\partial \theta_1(X_1, H_1, \tau)}{\partial Y_1} = 0$$ Eq. 71

$$\theta_2(X_2, Y_2, 0) = 0, \ \theta_2(0, Y_2, \tau) = 0,$$
$$\frac{\partial \theta_2(X_2, 0, \tau)}{\partial Y_2} = -(1+\beta_q\sin(\gamma\tau)),$$
$$\frac{\partial \theta_2(X_2, H_2, \tau)}{\partial Y_2} = 0$$ Eq. 70

Based on physical conditions, the intermediate substrate was taken to be insulated and the Nusselt number at the lower and the upper substrates are defined as:

$$Nu_1(X_1, \tau) \equiv \frac{h_{cl}h_o}{k_1} = -\frac{1}{1-\theta_{1m}}\frac{\partial \theta_1(X_1, 0, \tau)}{\partial Y_1}$$ Eq. 73

$$Nu_u(X_2, \tau) \equiv \frac{h_{cu}h_o}{k_2} = \frac{1}{\theta_2(X_2, 0, \tau) - \theta_{2m}(X_2, \tau)}$$
$$= \frac{1}{\theta_u(X_2, \tau) - \theta_{2m}(X_2, \tau)}$$ Eq. 74 where $h_{cl}$ and $h_{cu}$ are the convective heat transfer coefficients for the lower and upper substrates, respectively.

The quantities $\theta_{im}$ and $U_{im}$ are the sectional dimensionless mean bulk temperature and the dimensionless average velocity for the $i^{th}$ layer and are given as:

$$\theta_{im}(X_i, \tau) = \frac{1}{U_{im}(X_i, \tau)H_i}\int_0^{H_i} U_i(X_i, Y_i, \tau)\theta_i(X_i, Y_i, \tau)dY_i$$ Eq. 75

$$U_{im}(X_i, \tau) = \frac{1}{H_i}\int_0^{H_i} U_i(X_i, Y_i, \tau)dY_i$$

where $U_{im}$ is the dimensionless average velocity at a given section for the $i^{th}$ layer. For the primary fluid passage, the dimensionless heat flux at a given section is defined as follows:

$$\Theta(X_1, \tau) = -\frac{\partial \theta_1(X_1, 0, \tau)}{\partial Y_1}$$ Eq. 76

1C. Dimensionless Flow Rate Parameter for the Primary Fluid Layer

The obtained dimensionless film thickness for the primary fluid layer $H_1$ can be used to determine the dimensionless flow rate of the fluid in the primary fluid passage at the mid section for the CIP condition. The latter is an important parameter should be controlled and is referred to as $\Psi_{X=0.5}$ where X=0.5 denotes the location at $X_1$=0.5. This parameter can be calculated from the following relation:

$$\Psi_{X=0.5} = \frac{Q_{X=0.5}}{(V_{ol} + \omega B)h_o} = \frac{(12-\sigma_1)}{12}H_1^3$$ Eq. 77 where $Q_{X}$=0.5 is the dimensional flow rate at X=0.5 in the main thin film.

1D. Numerical Procedure

The procedure for the numerical solution is summarized as follows:

1. Initially, a value for $H_T$ is assumed.
2. The dimensionless thicknesses for the lower and upper layers $H_1$ and $H_2$ are determined by solving Equations 41, 49, 62, 69, and 70 simultaneously, using an explicit formulation. The velocity field, $U_i$ and $V_i$, is then determined from Equations 55, 56, 65, and 66.
3. Reduced energy equations, Equation 59, are solved by first transferring them to a constant boundary domain using the following transformations:

$$\tau^* = \tau, \ \xi_I = X_i \text{ and } \eta_i = \frac{Y_i}{H_i}.$$

Tri-diagonal algorithm was implemented along with a marching scheme. See Blottner (1970) AIAA Journal 8:193-205. Backward differencing was chosen for the axial convective and transient terms and central differencing was selected for the derivatives with respect to $\eta_i$. The values of 0.008, 0.03, 0.001 were chosen for $\Delta\xi_i$, $\Delta\eta_i$ and $\Delta\tau^*$, respectively.

4. $H_T$ is updated from Equation 51 and steps (2) to (4) is repeated until:

$$\left| \frac{(H_T)_{new} - (H_T)_{old}}{(H_T)_{new}} \right| < 10^{-6} \qquad \text{Eq. 78}$$

5. The solution for the flow and heat transfer inside the two layers is determined.

6. Time is advanced by $\Delta\tau^*$ and steps (1) to (5) are repeated.

Numerical investigations were performed using different mesh sizes and time steps to assess and ascertain grid and time step independent results. Any reduction in the values of $\Delta\xi$, $\Delta\eta$ and $\Delta\tau^*$ below $\Delta\xi=0.008$, $\Delta\eta=0.03$ and $\Delta\tau^*=0.001$ cause less than about 0.2 percent error in the results.

The maximum value of the parameters $P_S$ is chosen to be 1.0. Beyond this value, the error associated with the low Reynolds number model will increase for moderate values of the dimensionless thermal expansion parameter, softness index of the seals, and the Prandtl number. As an example, the order of transient and convective terms in the momentum equations is expected to be less than 5.0 percent that of the diffusive terms for $P_S=1.0$, $\Pr=6.7$, $E_1^*=E_2^*=0.3$, $F_T=0.15$, $\beta_q=0.2$ and $\sigma_1=3.0$, $\sigma_2=6.0$. The parameters correspond, for example, to a main thin film filled with water and having $B=D=60$ mm, $h_o=0.3$ mm, $\omega=1.7s^{-1}$, $V_o=0.1$ m/s and $K^*=33000$ N/m.

1E. Discussions of the Results

Ideal gases produce about a 15 percent increase in the closed cavity volume under typical room conditions for a 45° C. temperature difference. Further, about a 60 percent increase in the convective heat transfer coefficient for about a 2 percent volume fraction of copper ultrafine particles has been reported. See Li & Xuan (2002) Science in China (Series E) 45:408-416. Accordingly, the parameters $F_T$ and $\lambda_2$ were varied until comparable changes have been attained in the dimensionless thin film thickness and the Nusselt number.

1F. Softness Index and Thermal Expansion Parameters of the Seal

The effects of the softness index of the seals of the present invention on the dynamics and thermal characterizations of a two-layered thin film operating at the CIP condition may be analyzed. For this analysis, softness index was considered to be equal for both layers, denoted by $E^*$ and corresponds to the case when both lower and upper layers fluids are identical. As the softness index $E^*$ increases, the dimensionless flow rate parameter for the primary fluid layer $\Psi_{X=0.5}$ increases. This is expected for cases where the average pressure of the lower layer is greater than that of the upper layer. Meanwhile the disturbance in the primary fluid layer thickness increases as $E^*$ increases. This phenomenon can be utilized in enhancing the cooling due to thermal dispersion in the secondary fluid flow as proposed by Equation 53. On the other hand, these disturbances may cause malfunctioning of any sensing devices placed in the flow passage since both flow dynamical effects and chemical reactions will be affected. The increase in $\Psi_{X=0.5}$ as $E^*$ increases causes an increase in the average dimensionless heat transfer $\Theta_{AVG}$ in the primary fluid layer and an increase in the average upper substrate temperature $(\theta_u)_{AVG}$ due to the shrinkage in the upper layer.

For the CIP condition, the increase in the dimensionless thermal expansion parameter $F_T$ of the upper flexible complex seals causes a reduction in $\Psi_{X=0.5}$ values and an increase in the disturbance at intermediate substrate. Consequently, the parameters $\Theta_{AVG}$ and $(\theta_u)_{AVG}$ decrease as $F_T$ increases. For CIF condition, the compression in the primary fluid layer film thickness increases the flow near the lower and intermediate substrates, thereby enhancing the thermal convection. As a result, thermally developed conditions are achieved within shorter distance from the inlet as $F_T$ increases. This alleviates thermal effects such as bimaterial effects in sensors. that the intermediate substrate becomes more stable for the effects that makes it closer to either the upper or lower substrates for a given softness index. The increase in the cooling of the upper layer due to an increase in $P_{S2}$ causes a relief in the primary fluid layer film thickness resulting in a reduction in its Nusselt number. See FIG. 31 for the CIF condition. Accordingly, the main inlet temperature is convected further downstream which may increase noise levels due bimaterial effects of certain sensors.

1G. Role of Thermal Dispersion Due to Ultrafine Suspensions

Due to their random motions, ultrafine particles tend to increase the heat exchange within the fluid causing the thermal dispersion effect. Therefore, as the dimensionless thermal dispersion parameter $\lambda$ increases, the thermal conductivity increases causing the upper substrate temperature $(\theta_u)_{AVG}$ to decrease. Thus, in turn, the values of $\Psi_{X=0.5}$ and $\Theta_{AVG}$ are increased while variations in $dH_1/d\tau$ are decreased as $\lambda$ increases. As such, the stability of the intermediate substrate is enhanced in the presence of dispersive flows. For the CIF condition, the relief in the primary fluid layer film thickness due to an increase in $\lambda$, reduces the convective heat transfer coefficient of the primary fluid layer. Thus, a decrease in $\Theta_{AVG}$ is associated. reducing the volumetric thermal expansion effects of the stagnant fluid. As such, the fluctuating rate at the intermediate substrate is reduced as $H_t$ increases for the selected range as shown in FIG. 35.

2. Cooling Enhancements in Thin Films Supported by Flexible Complex Seals in the Presence of Ultrafine Suspensions As provided herein, flow and heat transfer inside thin films supported by flexible complex seals, flexible seals having closed cavities of a stagnant fluid possessing a large coefficient of volumetric thermal expansion $\beta_T$ were studied in the presence of suspended ultrafine particles and under periodically varying thermal load conditions. The governing continuity, momentum and energy equations are non-dimensionalized and reduced to simpler forms. The deformation of the seal is related to the internal pressure and lower substrate's temperature based on the theory of linear elasticity and a linearized model for thermal expansion. As provided herein, enhancements in the cooling may be achieved by an increase in the volumetric thermal expansion coefficient, thermal load, thermal dispersion effects, softness of the supporting seals and the thermal capacitance of the coolant fluid. Further, thermal dispersion effects were found to increase the stability of the thin film. The noise in the thermal load was found to affect the amplitude of the thin film thickness, Nusselt number and the lower substrate temperature; however, it had a negligible effect on the mean values.

Thin films are widely used in cooling of many heating sources such as electronic components. These elements are used in thin films in cooling systems such as in flat heat pipes or microchannel heat sinks. See Moon et al. (2000) Internat'l J. of Microcircuits and Electronic Packaging 23:488-493, Fedorov & Viskanta (2000) Internat'l J. of Heat and Mass Transfer 43:399-415, and Zhu & Vafai (1999) Internat'l J. of Heat and Mass Transfer 42:2287-2297. A two phase flow in microchannel is capable of removing maximum heat fluxes generated by electronic packages yet the system may become unstable near certain operating conditions. See Bowers &

Mudawar (1994) ASME J. of Electronic Packaging 116:290-305. Further, the use of porous medium in cooling of electronic devices was found to enhance heat transfer due to increases in the effective surface area. See Hadim (1994) ASME J. of Heat Transfer 116:465-472. However, the porous medium creates a substantial increase in the pressure drop inside the thin film.

As provided herein, additional cooling can be achieved if the thin film thickness is allowed to increase by an increase in the thermal load which will cause the coolant flow rate to increase using flexible complex seals of the present invention, i.e. flexible seals having closed cavities of a stagnant fluid having a large value of the volumetric thermal expansion coefficient $\beta_T$.

In the presence of periodic external thermal loads, the thickness of a thin film supported by a flexible complex seal is expected to be periodic. This is because the stagnant fluid expands during maximum thermal load intervals allowing for a relaxation in the thin film thickness which causes a flooding of the coolant. On the other hand, the thin film is squeezed during minimum thermal loads intervals due to the contraction in the stagnant fluid in the closed cavities of the flexible complex seals.

One of the advantages of using flexible complex seals is that the increase in the coolant flow rate because of thermal expansion effects produces an additional cooling in the presence of suspended ultrafine particles. See Li & Xuan (2002) Science in China (Series E) 45:408-416. This is because the chaotic movement of the ultrafine particles, the thermal dispersion, increases with the flow where it is modeled in the energy equation by introducing an effective thermal conductivity of the coolant. See Xuan & Roetzel (2000) Internat'l J. of Heat and Mass Transfer 43:3701-3707. Further, large fluctuation rates that can be generated in the flow during severe squeezing conditions tend to increase the chaotic motions of the particles in the fluid which increases the energy transport in the coolant.

As provided herein, the enhancement in the cooling process inside thin films supported by flexible complex seals in the presence of suspended ultrafine particles was analyzed. The lower substrate of the examined thin film was considered to be under a periodically varying heat flux. The thin film thickness was related to the thermal load and the internal pressure through the volumetric thermal expansion coefficient of the stagnant fluid and the theory of linear elasticity applied to the supporting seals. The governing equations for flow and heat transfer were properly non-dimensionalized and reduced into simpler equations for low Reynolds numbers. The resulting equations were then solved numerically to determine the effects of the thermal load, volumetric thermal expansion coefficient of the stagnant fluid, the softness of the seal, thermal capacitance of the working fluid and the squeezing number on the dynamics and thermal characteristic of the thin films supported by flexible complex thin films. As provided herein, the flexible complex seals of the present invention are useful in enhancing the cooling and can be used for additional purposes such as for diagnosing functions for heating sources so long as they possess large thermal expansion coefficient.

The following Table 7 provides the various symbols and meanings used in this section:

TABLE 7

| | |
|---|---|
| A* | a closed cavity dimension parameter |
| B | thin film length |
| $C_F$ | volumetric thermal expansion correction factor |
| C* | coefficient of thermal dispersion |
| $c_p$ | average specific heat of the working fluid or the dilute mixture |
| D | width of the thin film |
| $d_s$ | characteristic parameter of the seal |
| E | effective modulus of elasticity for the sealing assembly |
| G | width of the closed cavity |
| $F_n$ | fixation parameter |
| $F_T$ | dimensionless thermal expansion parameter |
| H, h, $h_o$ | dimensionless, dimensional and reference thin film thicknesses |
| $h_c$ | convective heat transfer coefficient |
| k | thermal conductivity of the working fluid or the dilute mixture |
| $k_o$ | reference thermal conductivity of the fluid |
| $Nu_L$ | lower substrate's Nusselt number |
| $P_S$ | thermal squeezing parameter |
| p | fluid pressure |
| $q_o$ | reference heat flux at the lower substrate |
| T, $T_1$ | temperature in fluid and the inlet temperature |
| t | Time |
| $V_o$ | reference axial velocity |
| U, u | dimensionless and dimensional axial velocities |
| V, v | dimensionless and dimensional normal velocities |
| X, x | dimensionless and dimensional axial coordinates |
| Y, y | dimensionless and dimensional normal coordinates |
| $\beta_q$ | dimensionless amplitude of the thermal load |
| $\beta_T$ | coefficient of volumetric thermal expansion of the stagnant fluid |
| $\epsilon$ | perturbation parameter |
| $\gamma$ | dimensionless frequency |
| $\mu$ | averaged dynamic viscosity of the working fluid or the dilute mixture |
| $\theta$, $\theta_m$ | dimensionless temperature and dimensionless mean bulk temperature |
| $\theta_w$ | dimensionless temperature at the lower substrate |
| $\rho$ | averaged density of the working fluid or the dilute mixture |
| $\upsilon$ | averaged kinematic viscosity of the working fluid or the dilute mixture |
| $\tau$, $\tau^*$ | dimensionless time |
| $\sigma$ | squeezing number |
| $\omega$ | reciprocal of a reference time (reference squeezing frequency) |
| $\eta$ | variable transformation for the dimensionless Y-coordinate |
| $\lambda$ | dimensionless thermal dispersion parameter |
| $\Pi$ | dimensionless pressure |
| $\Pi_i$ | dimensionless inlet pressure |
| $\Lambda$ | reference lateral to normal velocity ratio |

2A. Problem Formulation

Figure 2A:
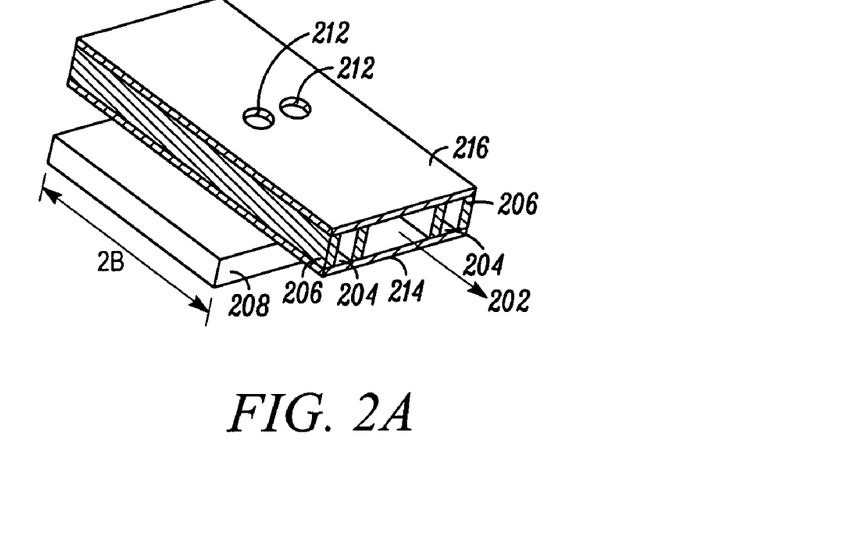
FIG. 2A illustrates a perspective view of a thin film according to another embodiment.
Figure 2B:
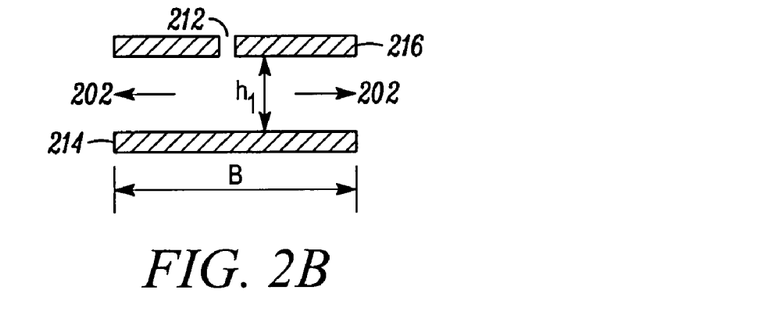
FIG. 2B illustrates a view of a slice of the thin film of FIG. 2A parallel to an axial direction according to an embodiment.
Figure 2C:
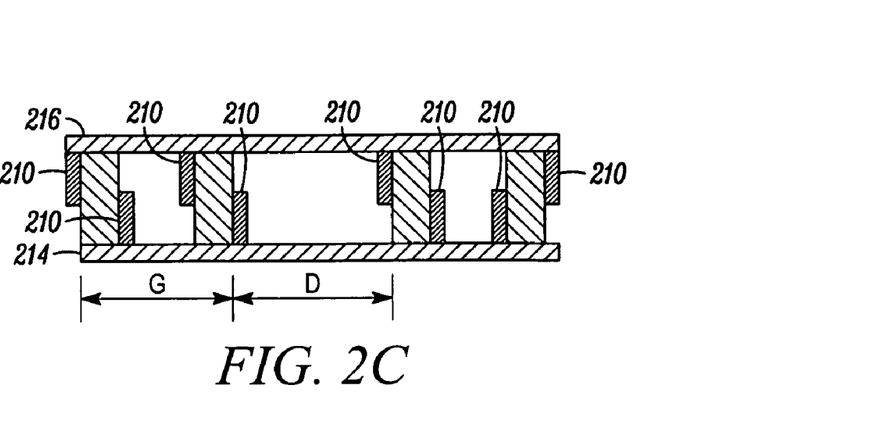
FIG. 2C illustrates a view of the slice of the thin film of FIG. 2A perpendicular to the axial direction according to an embodiment.

FIGS. 2A, 2B, and 2C illustrate a thin film having a flexible complex seal. FIG. 2A illustrates a perspective view, FIG. 2B illustrates a view of a slice parallel to the axial direction (arrow 202), and FIG. 2C illustrates a view of a slice perpendicular to the axle direction. Arrows 202 in FIG. 2B indicate the exit ports for the fluid flow. FIG. 2B represents a slice that cuts across an inlet port. so that inlet port 212 is shown. For ease of illustration, the slice represented by FIG. 2C does not cut across an inlet port. The flexible complex seal 204 comprises closed cavities filled with a stagnant fluid having relatively a large coefficient of volumetric thermal expansion. Flexible seals 206 are also included in order to allow the thin film to expand. The flexible seals 206 and flexible complex seals 204 of the present invention may comprise a closed cell rubber foam. See Friis et al. (1988) J. of Materials Science 23:4406-4414. Any excessive heat increases the temperature of the substrate. Thus, the stagnant fluid becomes warmer and expands. The flexible seals 206 are flexible enough so that the expansion results in an increase in the separation between the lower and the upper substrates. Accordingly, the flow resistance of the working fluid passage decreases causing a flooding of the coolant. As a result, the excessive heating from the source 208 is removed. The flexible seals 206 can be placed between guiders 210 as shown in FIG. 2C in order to minimize side expansion of the seals and maximize transverse thin film thickness expansion.

The analysis is concerned with a thin film that has a small thickness h compared to its length B and its width D. Therefore, a two-dimensional flow is assumed. The x-axis was taken along the axial direction 202 of the thin film while the y-axis was taken along its thickness. Further, the film thickness was assumed to be independent of the axial coordinate such as in two main cases: symmetric thin films having a fluid injected from the center inlet ports 212 as shown in FIG. 2A and in multiple passages thin films having alternating coolant flow directions.

The lower substrate 214 of the thin film was assumed to be fixed (immobile and inflexible substrate) and in contact with or adjacent to a heating source 208 while the upper substrate 216 was attached to the lower substrate by flexible complex seals 204 and 206, allowing it to expand (mobile and inflexible substrate). The motion of the upper substrate 216 due to both internal variations in the stagnant fluid temperature and the induced internal pressure pulsations as a result of oscillating thermal loads is expressed according to the following relation:

$$H \equiv \frac{h}{h_o} = (1 + H_T + H_p) \qquad \text{Eq. 80}$$

where
h is the thin film thickness
h0 is a reference film thickness
H is the dimensionless thin film thickness
$H_T$ is the dimensionless motion of the upper substrate due to the thermal expansion of the stagnant fluid
$H_p$ is the dimensionless motion of the upper substrate as a result of the deformation of seals due to the average internal pressure of the working fluid.

The fluid is assumed to be Newtonian having constant average properties except for the thermal conductivity. The general two-dimensional continuity, momentum and energy equations for a laminar flow of the working fluid inside the thin film are given as:

$$\frac{\partial u}{\partial x} + \frac{\partial v}{\partial y} = 0 \qquad \text{Eq. 81}$$

$$\rho\left(\frac{\partial u}{\partial t} + u\frac{\partial u}{\partial x} + v\frac{\partial u}{\partial y}\right) = -\frac{\partial p}{\partial x} + \mu\left(\frac{\partial^2 u}{\partial x^2} + \frac{\partial^2 u}{\partial y^2}\right) \qquad \text{Eq. 82}$$

$$\rho\left(\frac{\partial v}{\partial t} + u\frac{\partial v}{\partial x} + v\frac{\partial v}{\partial y}\right) = -\frac{\partial p}{\partial y} + \mu\left(\frac{\partial^2 v}{\partial x^2} + \frac{\partial^2 v}{\partial y^2}\right) \qquad \text{Eq. 83}$$

$$\rho c_p\left(\frac{\partial T}{\partial t} + u\frac{\partial T}{\partial x} + v\frac{\partial T}{\partial y}\right) = \frac{\partial}{\partial x}\left(k\frac{\partial T}{\partial x}\right) + \frac{\partial}{\partial y}\left(k\frac{\partial T}{\partial y}\right) \qquad \text{Eq. 84}$$

where
T is temperature
u is the dimensional axial velocity
v is the dimensional normal velocity
ρ is the average density
p is pressure
μ is the average dynamic viscosity
$c_p$ is the average specific heat
k is the thermal conductivity The previous fluid properties are for the pure working fluid in the case where the fluid is free from any suspensions. In the presence of suspended ultrafine particles, the previous properties will be for an approximated new continuum fluid composed from the mixture of the pure fluid and the suspensions. See Xuan & Roetzel (2000) Internat'l J. of Heat and Mass Transfer 43:3701-3707. The new properties of the mixture are related to the fluid and the particle properties through the volume fraction of the suspended particles inside the thin film and the thermal dispersion parameter.

The following dimensionless variables were used to non-dimensionalized Equations 81-84:

$$X = \frac{x}{B} \qquad \text{Eq. 85a}$$

$$Y = \frac{y}{h_o} \qquad \text{Eq. 85b}$$

$$\tau = \omega t \qquad \text{Eq. 85c}$$

$$U = \frac{u}{(\omega B + V_o)} \qquad \text{Eq. 85d}$$

$$V = \frac{v}{h_o \omega} \qquad \text{Eq. 85e}$$

$$\Pi = \frac{p - p_e}{\mu\left(\omega + \frac{V_o}{B}\right)\varepsilon^{-2}} \qquad \text{Eq. 85f}$$

$$\theta = \frac{T - T_1}{(q_o h_o)/k_o} \qquad \text{Eq. 85g}$$

where ω, $T_1$, $P_e$, $q_o$ and $V_o$ are the reference frequency of thermal load, inlet temperature of the fluid, a constant representing the exit pressure, reference heat flux and a constant representing a reference dimensional velocity, respectively. The term $k_o$ corresponds to the working fluid thermal conductivity in the absence of any suspensions while it is the stagnant thermal conductivity, free from the dispersion term, for the dilute mixture between the fluid and the ultrafine suspensions. The stagnant thermal conductivity has usually an enhanced value when compared to that of the pure fluid for metallic particles. See Eastman et al. (2001) Applied Physics Letters 78:718-720.

The upper substrate is assumed to be insulated to simplify the analysis and that the lower substrate was subjected to a periodically varying wall heat flux $q_L$ condition according to the following relation:

$$q_L = q_o(1 + \beta_q \sin(\gamma\omega t)) \qquad \text{Eq. 86}$$

where $\beta_q$ and γ are the dimensionless amplitude of the lower substrate's heat flux and a dimensionless frequency, respectively. The variables X, Y, τ, U, V, Π and θ are the dimensionless forms of x, y, t, u, v, p and T variables, respectively. The parameter ε appearing in Equation 85f is the perturbation parameter, $$\varepsilon = \frac{h_o}{B}.$$

For the thin film shown in FIG. 2A, the displacement of the upper substrate 216 due to internal pressure variations is related to the average dimensionless pressure of the working fluid, $\Pi_{AVG}$, through the theory of linear elasticity by the following relation:

$$H_p = F_n \Pi_{AVG} \qquad \text{Eq. 87}$$

This is based on the fact that the upper substrate is assumed to be rigid and that the applied force on an elastic material, the flexible seal, is assumed to behave as an elastic material, is proportional to the elongation of this material. See Norton (1998) Machine Design; An Integrated Approach Prentice-hall,, New Jersey. The parameter $F_n$ is referred to as the fixation parameter and is a measure of the softness of the seal, flexible seals have large $F_n$ values, and is equal to:

$$F_n = \frac{\mu(V_o + \omega B)}{E\varepsilon^2 d_s} \quad \text{Eq. 88}$$

where E and $d_s$ are the effective modulus of elasticity for the complex seal and a characteristic parameter which depends on the seal's dimensions and the thin film width D, respectively. The quantity $d_s$ equal to the effective dimension of the seal's cross section times the ratio of the total length of the seal divided by the thin film width D. The seal is considered to have isotropic properties. Further, the effective dimension of the seals times their total length represents the contact area between the seals and the upper or lower substrates when the seals have a rectangular cross section as shown in FIGS. 2A, 2B and 2C. Other than this, the effective diameter requires a theoretical determination.

As provided herein, the analysis was performed for relatively small thermal load frequencies in order to ascertain that squeezing generated flows have relatively small Reynolds numbers. For these frequencies, Equation 87 is applicable and the inertia effect of the upper substrate is negligible. Moreover, the increase in the thickness due to a pressure increase in the thin film causes a reduction in the stagnant fluid pressure. This action stiffens the insulating assembly. Therefore, the parameter E is considered to be the effective modulus of elasticity for the insulating assembly not for the seal itself. Practically, the closed cavity width G is assumed to be large enough such that a small increase in the stagnant fluid pressure due to the expansion can support the associated increase in the elastic force on the seal.

The dimensionless displacement of the upper substrate due to thermal expansion is related to the dimensionless average temperature of the lower substrate, $(\theta_W)_{AVG}$, by the following linearized model:

$$H_T = F_T (\theta_W)_{AVG} \quad \text{Eq. 89}$$

where $F_T$ is named the dimensionless thermal expansion parameter and is equal to:

$$F_T = A^* \frac{\beta_T q_o h_o}{k_o} C_F \quad \text{Eq. 90}$$

where $A^*$ is a constant depending on the closed cavities dimensions and geometry. The parameter $\beta_T$ is the volumetric thermal expansion coefficient of the stagnant fluid in its approximate form: $\beta_T \approx (1/V_{So})[(V_S - V_{S1})/(T_S - T_1)]|_{p_{S1}}$ evaluated at the pressure $p_{s1}$ corresponding to the stagnant fluid pressure at the inlet temperature $T_1$. The quantities $V_{S1}$ and $V_S$ represent the closed cavity volumes at normal operating conditions when the stagnant fluid is at $T_1$ and at the present stagnant fluid temperature $T_S$, respectively. The parameter $V_{So}$ represents the closed cavity volume at the reference condition. The factor $C_F$ represents the volumetric thermal expansion correction factor. This factor was introduced in order to account for the increase in the stagnant pressure due to the increase in the elastic force in the seal during the expansion which tends to decrease the effective volumetric thermal expansion coefficient. It approaches one as the closed cavity width G increases and may be determined theoretically using methods known in the art.

The parameter $F_T$ is enhanced at elevated temperatures for liquids and at lower temperature for gases because $\beta_T$ increases for liquids and decreases for gases as the stagnant temperature increases. Dimensionless thermal expansion parameter is also enhanced by a decrease in $k_o$, an increase in $q_o$, an increase in $F_n$ or by increases in $h_o$. Equation 89 is based on the assumption that the stagnant fluid temperature is similar to the lower substrate temperature since entire closed cavity surfaces were considered insulated except that facing the lower substrate. Furthermore, the heat flux of the heating source is applied on the portion of the lower substrate that is facing the working fluid. The other portion which faces the seals is taken to be isolated from the heating source and the environment to minimize the variation in the lower substrate temperature along the width direction.

In the presence of suspended ultrafine particles in the working fluid, the thermal conductivity of the working fluid composed from the pure fluid and suspensions is expected to vary due to the thermal dispersion. To account for these variations, the following model which is similar to the Xuan & Roetzel ((2000) Internat'l J. of Heat and Mass Transfer 43:3701-3707) model that linearly relates the effective thermal conductivity of the working fluid to the fluid speed is utilized:

$$k(X, Y, \tau) = k_o(1 + \lambda \sqrt{U^2(X,Y,\tau) + \Lambda^2 V^2(X,Y,\tau)}) = k_o \phi(X, Y, \tau) \quad \text{Eq. 91}$$

where $\lambda$ and $\Lambda$ are the dimensionless thermal dispersion coefficient and the reference squeezing to lateral velocity ratio which are:

$$\lambda = C^*(\rho c_p) h_o (V_o + \omega B) \quad \text{Eq. 92a}$$

$$\Lambda = \frac{\varepsilon \sigma}{12} \quad \text{Eq. 92b}$$

where $C^*$ is the coefficient of the thermal dispersion which depends on the diameter of the ultrafine particles, its volume fraction (ratio of the particles volume to the total thin film volume), and both fluid and ultrafine particles properties. Ultrafine particles include particles that are extremely small compared with the thickness of the thin film.

The coefficient $C^*$ is expected to increase by an increase in the diameter of the particles, their volume fraction, their surface roughness and the working fluid Prandtl number, $Pr = (\rho c_p \upsilon)/k_o$. On the other hand, the stagnant thermal conductivity $k_o$ increases with an increase in both the volume fraction and the surface area of the particles. A dilute mixture of ultrafine suspensions and water produce no significant change in the pressure drop compared to pure water which reveals that the viscosity is a weak function of the fluid dispersion for a dilute mixture.

Generally, flows inside thin films are in laminar regime and could be creep flows as in lubrication. Therefore, the low Reynolds numbers (the modified lateral Reynolds number $Re_L = (V_o h_o)\varepsilon/\upsilon$ and the squeezing Reynolds number $Re_S = (h_o^2 \omega)/\upsilon$) flow model was used herein. These insulating assemblies neglect the transient and convective terms in momentum equations, Equations 82 and 83. These terms become incomparable to the pressure gradient and diffusive terms for small squeezing frequencies and reference velocities. Application of these insulating assemblies to Equations 82-84 and the outcome of dimensionalizing the energy equation, Equation 85, result in the following reduced non-dimensionalized equations:

$$U = \frac{1}{2}\frac{\partial \Pi}{\partial X}H^2\left(\frac{Y}{H}\right)\left(\frac{Y}{H}-1\right) \qquad \text{Eq. 93}$$

$$V = \frac{dH}{d\tau}\left(3\left(\frac{Y}{H}\right)^2 - 2\left(\frac{Y}{H}\right)^3\right) \qquad \text{Eq. 94}$$

$$\frac{\partial}{\partial X}\left(H^3\frac{\partial \Pi}{\partial X}\right) = \sigma\frac{\partial H}{\partial \tau} \qquad \text{Eq. 95}$$

$$P_S\left(\frac{\partial \theta}{\partial \tau} + \frac{12}{\sigma}U\frac{\partial \theta}{\partial X} + V\frac{\partial \theta}{\partial Y}\right) = \frac{\partial}{\partial Y}\left(\phi\frac{\partial \theta}{\partial Y}\right) \qquad \text{Eq. 96}$$

Note that Equation 96 is based on the assumption that the axial conduction is negligible when compared to the transverse conduction. The parameters σ and $P_S$ are referred to as the squeezing number and the thermal squeezing parameter, respectively, and are defined as:

$$\sigma = \frac{12}{1 + \frac{V_o}{\omega B}} \qquad \text{Eq. 97a}$$

$$P_S = \frac{\rho c_p h_o^2 \omega}{k_o} \qquad \text{Eq. 97b}$$

Both inlet and exit dimensionless pressures were assumed constant and the following relationship was obtained between the inlet dimensionless pressure and the squeezing number based on the assumption that the reference velocity $V_o$ represents the average velocity in the thin film at zero values of $F_T$ and $F_n$:

$$\Pi_i = 12 - \sigma \qquad \text{Eq. 98}$$

Accordingly, the dimensionless pressure gradient, the dimensionless pressure and the average dimensionless pressure $\Pi_{AVG}$ inside the thin film are related to the squeezing number through the following equations:

$$\frac{\partial \Pi(X,\tau)}{\partial X} = \frac{\sigma}{H^3}\frac{dH}{d\tau}\left(X - \frac{1}{2}\right) - (12 - \sigma) \qquad \text{Eq. 99}$$

$$\Pi(X,\tau) = \frac{\sigma}{2H^3}\frac{dH}{d\tau}(X^2 - X) - (12-\sigma)(X-1) \qquad \text{Eq. 100}$$

$$\Pi_{AVG}(\tau) = -\frac{\sigma}{12H^3}\frac{dH}{d\tau} + \frac{(12-\sigma)}{2} \qquad \text{Eq. 101}$$

The dimensionless thermal boundary conditions for the previously defined problem are taken as follows:

$$\theta(X, Y, 0) = 0, \qquad \text{Eq. 102}$$

$$\theta(0, Y, \tau) = 0,$$

$$\frac{\partial \theta(X, 0, \tau)}{\partial Y} = -(1 + \beta_q \sin(\gamma \tau)),$$

$$\frac{\partial \theta(X, H, \tau)}{\partial Y} = 0$$

Based on the physical conditions, the Nusselt number is defined as:

$$Nu_L(X,\tau) \equiv \frac{h_c h_o}{k} = \frac{1}{\theta(X, 0, \tau) - \theta_m(X, \tau)} \qquad \text{Eq. 103}$$

$$= \frac{1}{\theta_W(X, \tau) - \theta_m(X, \tau)}$$

The parameter $\theta_m$ is the dimensionless mean bulk temperature and is given as:

$$\theta_m(X, \tau) = \frac{1}{U_m(X,\tau)H}\int_0^H U(X, Y, \tau)\theta(X, Y, \tau)dY \qquad \text{Eq. 104}$$

$$U_m(X, \tau) = \frac{1}{H}\int_0^H U(X, Y, \tau)dY$$

where $U_m$ is the dimensionless average velocity at a given section.

2B. Numerical Procedure

The procedure for the numerical solution is summarized as follows:

1. Initially, a value for $H_T$ is assumed.
2. At the present time, the dimensionless thickness of the thin film H is determined by solving Equations 80, 87, 88, and 101 simultaneously, using an explicit formulation. The velocity field, U and V, is then determined from Equations 93, 94, and 99.
3. At the present time, the reduced energy equation, Equation 96, is transferred into one with constant boundaries using the following transformations:

$$\tau^* = \tau, \xi = X \text{ and } \eta = \frac{Y}{H}.$$

A tri-diagonal solution was implemented along with a marching scheme. See Blottner (1970) AIAA Journal 8:193-205. Backward differencing was chosen for the axial convective and transient terms and central differencing was selected for the derivatives with respect to η. The values of 0.008, 0.03, 0.001 were chosen for Δξ, Δη and Δτ*, respectively.

4. $H_T$ is updated from Equation 89 and steps (2) to (4) is repeated until:

$$\left|\frac{(H_T)_{new} - (H_T)_{old}}{(H_T)_{new}}\right| < 10^{-6} \qquad \text{Eq. 105}$$

5. The converged solution for the flow and heat transfer inside the thin film is determined at the present time.
6. Time is advanced by Δτ* and steps (1) to (5) are repeated.

Numerical investigations were performed using different mesh sizes and time steps to assess and ascertain grid and time step independent results. Any reduction in the values of Δξ, Δη and Δτ* below Δξ=0.008, Δη=0.03 and Δτ*=0.001 results in less than about a 0.2 percent error in the results.

In the results, the maximum value of the parameters $P_S$ is chosen to be 1.0. Beyond this value, the error associated with the low Reynolds number model will increase for moderate values of the dimensionless thermal expansion parameter, fixation parameter, and the Prandtl number. As an example, the order of transient and convective terms in the momentum equations were found to be less 1.0 percent that of the diffusive terms for $P_S$=1.0, Pr=6.0, $F_n$=0.05, $F_T$=0.25, $\beta_q$=0.1 and $\sigma$=6.0. The parameters correspond, for example, to a thin film filled with water and having B=D=60 mm, $h_o$=0.3 mm, $d_s$=0.5 mm, $\omega$=2.0 s$^{-1}$, $V_o$=0.12 m/s and E=2(10$^5$) pa.

2C. Discussions of the Results

Ideal gases produce about a 15 percent increase in the closed cavity volume at room conditions for a 45° C. maximum temperature difference. Further, about a 60 percent increase in the convective heat transfer coefficient for a volume fraction of copper ultrafine particles of about a 2.0 percent has been reported. See Li & Xuan (2002) Science in China (Series E) 45:408-416. Accordingly, the parameters $F_T$ and $\lambda$ were varied until comparable changes have been attained in the dimensionless thin film thickness and the Nusselt number.

2D. Effects of Dimensionless Thermal Expansion Parameter

The parameter $F_T$ can be increased either by an increase in the volumetric thermal expansion coefficient of the stagnant fluid or by an increase in dimensional reference temperature ($q_o h_o$)/$k_o$. Both factors make the flexible complex seal softer. Thus, dimensionless thickness H is increased as $F_T$ increases. This allows more coolant to flow causing reductions in the average dimensionless lower substrate's temperature $(\theta_W)_{AVG}$ which can provide additional cooling to any heated surface such as surfaces of electronic components.

As thermal load increases, the average lower substrate's temperature increases; however, this increase can be reduced by using a flexible complex seal. This additional cooling may be obtained with no need for external controlling devices, thereby providing extra safety for an electronic components such as a heated surface, when the thermal loads increase over the projected capacity. The fluctuation rate at the upper substrate, $|dH/d\tau|$, is noticed to increase as $F_T$ increases, which may be an advantage for the cooling process especially at high levels of fluctuation rates the thermal dispersion will be enhanced in the coolant when suspended ultrafine particles are present. The Nusselt number is decreased as $F_T$ increases because it is inversely proportional to H, which is the reason that the percentage decrease in lower substrate temperatures is lower than the percentage increase in the thin film thickness as $F_T$ increases.

2E. Effects of Dimensionless Thermal Dispersion Parameter

The dimensionless thermal dispersion parameter $\lambda$ of the coolant fluid on the average lower substrate's temperature of the thin film. This parameter may be increased either by increasing the diameter of the ultrafine particles or increasing the roughness of these particles while keeping a fixed volume fraction inside the coolant, thereby ensuring that thermal squeezing parameter remains constant. The thermal dispersion can provide additional cooling to a heated element, thereby causing an additional reduction in the average dimensionless lower substrate temperature $(\theta_W)_{AVG}$. Part of this cooling is due to the expansion process since it results in flooding of the working fluid which increases the irregularity and the random motion of the particles. This causes additional enhancements in the energy exchange rate. Another part for the enhancement in the cooling is attributed to the fact that the noise in the thermal load, especially those having heterogeneous fluctuation rates, produces additional squeezing due to the velocities that appear in Equation 91.

Due to the reduction in the lower substrates temperatures as $\lambda$ increases, the dimensionless thin film thickness decreases as $\lambda$ increases. Additional enhancements in the thermal dispersion effect are expected as both the perturbation parameter and the squeezing number increase as suggested by Equations 91 and 92. Both effects result in a magnification in the fluctuation rates in the flow which causes additional increases in the cooling process. As provided herein, the perturbation parameter and the fluctuation rates are small and their effects are not noticeable.

The reduction in thermal resistance across the transverse direction when $\lambda$ increases causes the temperature profiles to be more flattened as $\lambda$ increases. Accordingly, the Nusselt number increases as $\lambda$ increases The fluctuation rate at the upper substrate, $|dH/d\tau|$, decreases as $\lambda$ increases. As a result, ultrafine particle suspensions inside thin films supported by flexible complex seals not only cause enhancements in heat transfer but also make these thin films dynamically more stable. In this insulating assembly, an increase in $\lambda$ between zero and unity cause a reduction in the average lower temperature by dimensionless temperature of about 0.12 and an increase in the Nusselt number by about 50 percent.

We claim:

1. An apparatus comprising:
a first substrate and a second substrate, the first substrate having a face and the second substrate having a face substantially parallel to the face of the first substrate;
a first at least one flexible seal attached to the first substrate and to the second substrate to form at least one closed cavity comprising a stagnant fluid so that the first substrate moves relative to the second substrate when the stagnant fluid undergoes volumetric thermal expansion;
a first at least one guider attached to the first substrate; and
a second at least one guider attached to the second substrate;
wherein the first at least one guider and the second at least one guider are adjacent to the first at least one flexible seal so that the first substrate moves relative to the second substrate substantially along a direction to the normal faces of the first and second substrates when the stagnant fluid undergoes volumetric thermal expansion.

2. The apparatus as set forth in claim 1, further comprising:
a third substrate; and
a second at least one flexible seal attached to the second substrate and to the third substrate to form a primary channel;
the first substrate, the second substrate, and the first at least one flexible seal forming a secondary channel.

3. The apparatus as set forth in claim 2, wherein the first, second and third substrates are substantially inflexible.

4. The apparatus as set forth in claim 2, wherein:
the first substrate comprises a first inlet port; and
the third substrate comprises a second inlet port.

5. The apparatus as set forth in claim 2, the first substrate having a face, and the second substrate having a face substantially parallel to the face of the first substrate, the apparatus further comprising:
a first at least one guider attached to the first substrate; and
a second at least one guider attached to the second substrate;
wherein the first at least one guider and second at least one guider are adjacent to the first at least one flexible seal so that the first substrate moves relative to the second substrate substantially along a direction normal to the faces of the first and second substrates when the stagnant fluid undergoes volumetric thermal expansion.

6. An apparatus comprising:
a first substrate and a second substrate;
a first at least one flexible seal attached to the first substrate and to the second substrate to form at least one closed cavity comprising a stagnant fluid;

the first substrate, the second substrate, and the first at least one flexible seal forming a channel with at least one exit port for fluid flow;

a guider attached to the first substrate; and the first at least one flexible seal comprising a flexible seal having a surface not in contact with the stagnant fluid and adjacent to the guider.

7. The apparatus as set forth in claim 6, further comprising:

a third substrate; and a second at least one flexible seal attached to the second substrate and to the third substrate.

8. The apparatus as set forth in claim 7, the second substrate, the third substrate, and the second at least one flexible seal forming a primary channel with at least one exit port for fluid flow.

9. The apparatus as set forth in claim 8, wherein the first, second, and third substrates are substantially inflexible.

10. The apparatus as set forth in claim 8, wherein:

the first substrate comprises a first inlet port for fluid flow to the channel; and the third substrate comprises a second inlet port for fluid flow to primary channel.

11. The apparatus as set forth in claim 7, further comprising:

a guider attached to the first substrate;

the first at least one flexible seal comprising a flexible seal having a surface not in contact with the stagnant fluid and adjacent to the guider.

\* \* \* \* \*